United States Patent [19]

Hergert

[11] Patent Number: 5,740,038
[45] Date of Patent: Apr. 14, 1998

[54] SYSTEM AND METHOD FOR OPTIMIZED CONTROL OF MOVING IRRIGATION SYSTEMS

[76] Inventor: C. David Hergert, 110465 County Rd. 17, Mitchell, Nebr. 69357

[21] Appl. No.: 721,226

[22] Filed: Sep. 26, 1996

[51] Int. Cl.$^6$ ..................................................... G06F 17/60
[52] U.S. Cl. ....................................................... 364/420
[58] Field of Search .......................... 364/420; 348/117; 47/48.5

[56] References Cited

U.S. PATENT DOCUMENTS

| | | | |
|---|---|---|---|
| 4,015,366 | 4/1977 | Hall, III | 47/1.01 R |
| 4,646,224 | 2/1987 | Ransburg et al. | 364/143 |
| 4,922,433 | 5/1990 | Mark | 364/420 |
| 5,021,939 | 6/1991 | Pulgiese | 364/420 |
| 5,229,937 | 7/1993 | Evelyn-Veere | 364/420 |
| 5,467,271 | 11/1995 | Abel et al. | 364/420 |
| 5,601,236 | 2/1997 | Wold | 239/63 |
| 5,604,534 | 2/1997 | Hedges et al. | 348/144 |
| 5,666,648 | 9/1997 | Stuart | 370/321 |
| 5,668,719 | 9/1997 | Bobrov et al. | 364/420 |

OTHER PUBLICATIONS

Article Entitled *Pivot Network On-Line at T-16 Ranch.*
Article Entitled *Valley Base Station is the Solution to Too Many Miles of Travel.*
*Precision Farming: A Practical Guide (Part I)*, Soybean Digest Mid-Feb. 1996.
*Precision Farming: A Practical Guide (Part II)*, Soybean Digest Mid-Mar., 1996.
Article Entitled *Programmable Irrigation Control System.*
Product Literature, Valley Irrigation Products, *Valley Product Review.*
Product Literature, Valley Irrigation Products, *Control Technology.*
Product Literature, Valley Irrigation Products, *Remote Link.*
Product Literature, Valley Irrigation Products, *C:A:M:S Control Panel.*
Product Literature, Valley Irrigation Products, *C:A:M:S Base Station.*
Sandy Miller Hays, "Tending the fields From Afar", Agricultural Research, vol. 40, Iss. 2, Feb. 1992, p. 2.

*Primary Examiner*—Donald E. McElheny, Jr.
*Attorney, Agent, or Firm*—John R. Wahl; Holland & Hart LLP

[57] ABSTRACT

The system for optimization of irrigation system operation comprises a computer, a storage device coupled to the computer for storing data, a global positioning satellite transmission receiver coupled to the computer, a geographic information satellite transmission receiver coupled to the computer, a plurality of irrigation pivot controllers remotely coupled to the computer, and a grid power monitor coupled to the computer for providing power grid demand and usage data to the computer. The system may also include a plurality of sensors located in each of the irrigated fields which transmit soil information directly to the central computer and which supplement the information from the GIS satellite. The computer in turn generates priorities of operation for the irrigation systems based on the soil condition information and most economical load operating periods from the electrical power utility.

18 Claims, 2 Drawing Sheets

SYSTEM AND METHOD FOR OPTIMIZED CONTROL OF MOVING IRRIGATION SYSTEMS

BACKGROUND OF THE INVENTION

1. Field of the Invention

This invention generally relates to control systems for large electrical loads and more particularly to a system and method for optimizing control of central pivot and traveling irrigation pumps and spray header drive systems.

2. Description of the Related Art

Today, a farming operation typically covers a very large land area. Many of today's farming operations are becoming increasingly automated and operated remotely wherever possible. Computers are cropping up more and more in the farmhouse in order to maximize yields and practice precision farming techniques. Similarly, the irrigation requirements for such large areas become more complex. To meet this demand, pivot irrigation systems which may cover a circle on the order of a mile across have become very popular and wide spread throughout the mid-west and western states. Since it may take a farmer or his/her employee in these areas an hour or more to reach a distant field, the ability to remotely monitor and operate irrigation systems operation, including fertilizer applications, in that remote field quickly becomes economically advantageous.

For example, the T16 Ranch in southeast Washington state manages 64 central pivot irrigation systems covering 6700 acres of cultivated land with the help of an automated telemetry networked system coupled to a personal computer at the ranch headquarters. The telemetry system monitors start and stop of each pivot, monitors water pressure, monitors end gun hours, and auxiliary pump operation for addition of chemicals through the system. The computer includes a display of the status of each pivot system. The computer software allows the farmer to remotely start and stop and reverse pivot systems from a central location. Remote data collection stations are also located at the pivot locations which provide data to the computer database on wind speed, rainfall, temperature and water flow. This data may then be easily stored, tabulated and compiled into reports on the operations of the individual pivots or the entire farming operation.

Global positioning system receivers mounted on tractor cabs in conjunction with soil parameter sensors on the cultivators are also used to gather field specific soil condition information and provide input to a central computer database. This information is then used by the farm management software to generate grid maps of the fields and their conditions which can then be stored in a computer database. The farmer can then view these maps and make decisions as to appropriate fertilization and conditioning actions necessary to achieve optimum yields. These same receivers may also be used with appropriate moisture and grain flow sensors mounted on the harvesting equipment to obtain and monitor location specific yield information. This information is then integrated into the mapping database to provide the farmer with field specific information to aid in future decision making. These systems go a long way toward assisting the farmer in achieving efficient farm operations. However, there are a number of limitations on these systems and there are several things that these conventional systems do not do. They do not provide data on actual soil conditions in real time over the growing period. There is currently no remote mechanism for monitoring the actual conditions in the field during the growing season short of actually installing remote sensors in the field which sense, only at the sensor location, such characteristics as soil moisture, phosphorous, nitrogen and potassium content, etc. Soil conditions are dynamic. They change over the growing season depending on local rainfall, irrigation amounts, number of sun days, fertilizer and chemical applications etc. Therefore there is a continuing need for more accurate and dynamic monitoring systems and remote control systems applied to such precision farming operations.

Further, irrigation pumping systems for pivots require a great deal of electrical power. The typical rural electrical coops and power company generating stations are historically geared for supplying electrical power only for local farm yard type equipment and residential requirements. They are not generally equipped to handle the major power surges associated with operation of hundreds of pivot system pumps simultaneously. One solution which is utilized by power companies is to price the power to the farmer according to system supply availability and predicted usage at various rates. The power companies are also interested in levelizing the power demand to minimize the amount of power which must be obtained from outside in order to meet peak demands. Consequently, there is a need for an irrigation control system which integrates the irrigation requirements and needs of the farmer with the economically advantageous power rate, periods. In addition, there is a need in the power distribution community to levelize the overall electrical load requirements in order to provide their customers with power in the most economical, yet adequate manner Therefore there is a need for a complete optimization system and method for irrigation control which takes into account actual weather conditions, actual soil conditions, ongoing actual power system demands, special requirements of the farmer/operator, and prioritizes irrigation system operation in accordance with these needs and predetermined constraints.

SUMMARY OF THE INVENTION

The irrigation optimization system and method in accordance with the present invention particularly addresses and meets the above identified needs in the farming community.

It is therefore an object of the present invention to provide an irrigation control system which utilizes actual soil condition information and actual weather condition information to determine the need for irrigation system operation.

It is another object of the invention to provide an optimized control system and method for controlling the operation and timing of operation of a plurality of pivot irrigation systems.

It is another object of the invention to provide a control system and method which prioritizes irrigation needs of particular pivot systems in accordance with actual soil and weather conditions.

It is another object of the invention to provide a control system for irrigation systems which has the capability to automatically equalize the power load on the power grid.

It is a still further object of the present invention to provide a control system and method which includes maintaining a database of reported soil conditions, power usage, weather conditions, rainfall, etc.

The system in accordance with the present invention comprises a computer, a storage device coupled to the computer for storing data, a global positioning satellite transmission receiver coupled to the computer, a geographic information satellite transmission receiver coupled to the computer, a plurality of irrigation pivot controllers remotely coupled to the computer, and a grid power monitor coupled to the computer for providing power grid demand and usage data to the computer. The system may also include a plurality of sensors located in the field which transmit soil information directly to the central computer and which supplement the information from the GIS satellite.

The software control for the computer monitors the various inputs and optimizes the pivot operation frequency, duration and timing in order to provide optimized irrigation at the most economical power price. The software also provides periodic reports of power usage, pivot operations, soil conditions, etc., as may be desired by the operator and/or farmer.

The method in accordance with the invention method of optimizing operation of a remotely controlled irrigation system in an agricultural area basically comprises the steps of:

1) receiving a global positioning system (GPS) signal representative of a position of the irrigation system;
2) receiving a geographic information system (GIS) satellite signal and optionally receiving signals from remote sensors located in the agricultural area of soil conditions in the agricultural area in which the irrigation system is located;
3) correlating the GIS signal and/or remote sensor signals with the GPS signals to generate soil condition information at the position of the irrigation system; and
4) calculating a required period of irrigation system operation based on the soil conditions at the location of the irrigation system.

This method preferably further comprises the step of prioritizing operation of the irrigation system based on the soil condition information and receiving power demand and generating capacity information from a power generating facility supplying power to the irrigation system. The actual period of system operation is then scheduled to occur when the power is cheapest in order to levelize the power demand on the grid.

The method also preferably includes receiving a weather satellite signal of predicted weather conditions in the agricultural area, receiving a weather condition signal from the irrigation system location and then correlating the weather satellite signal with the GPS signal to generate predicted weather conditions at the irrigation system. The required period is then modified so that the required period of operation based on the predicted weather conditions at the irrigation system in addition to the other considerations.

The method according to the invention preferably further comprises the steps of receiving power demand and generating capacity information from a power generating facility supplying power to the irrigation system and scheduling operation of the irrigation system in accordance with the priority based on the soil conditions, the generating capacity information and a predetermined power capacity criteria provided by the farmer.

These and other objects, features, and advantages of the invention will become more apparent from a reading of the following detailed description when taken in conjunction with the accompanying drawing.

DETAILED DESCRIPTION OF THE INVENTION

Figure 1:
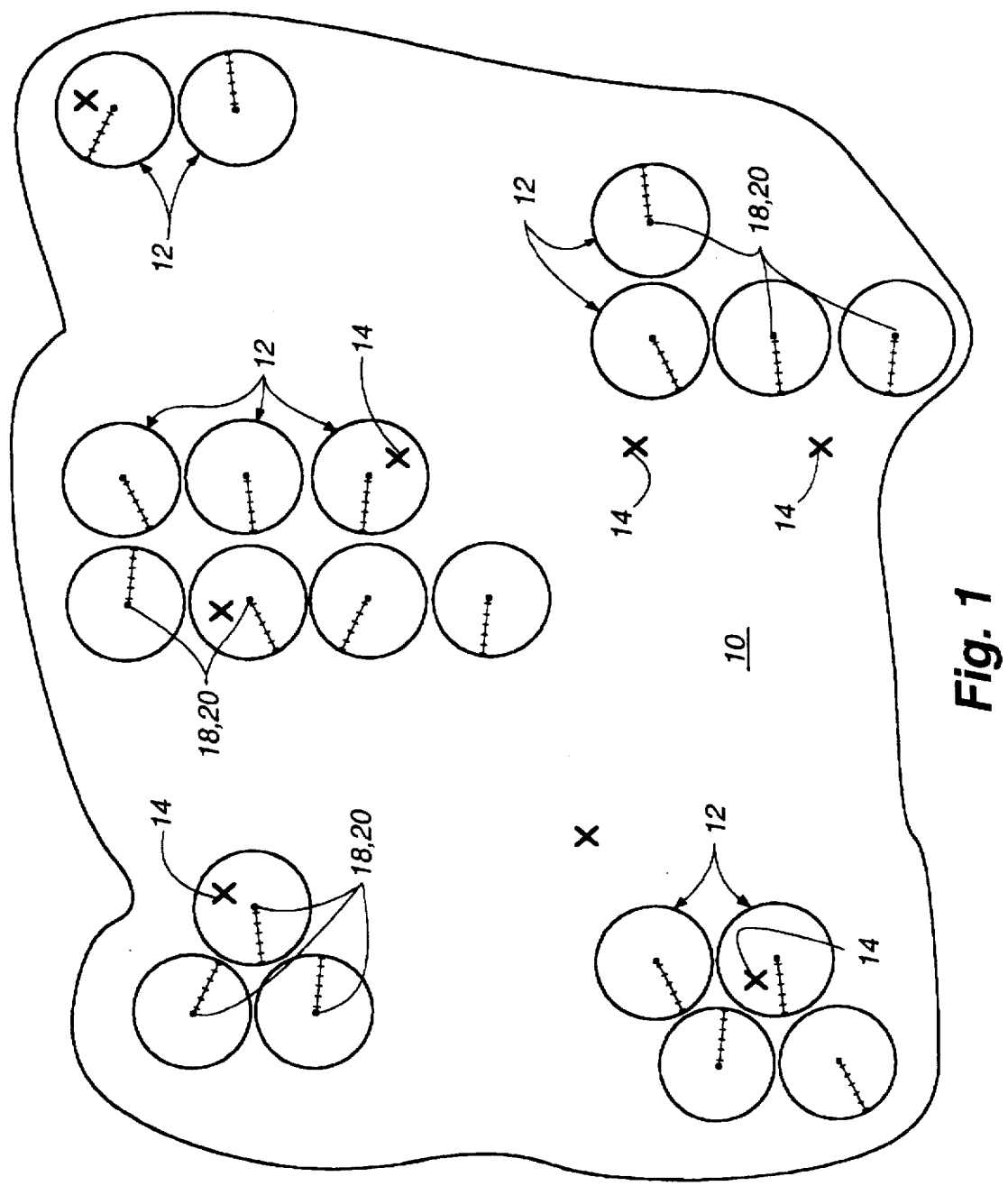
FIG. 1 is a schematic plan view of a large agricultural area having a number of operational pivot irrigation systems.

Referring now to FIG. 1, a partial plan view of a geographical agricultural area 10 is shown. The area is representative of a much larger agricultural area typically covering a number of counties. The area 10 includes a large number of irrigation units 12 which operate to supply water, chemicals, and other application substances to the fields over which they operate. As is shown, these units are central pivot irrigation systems. However, the system and method in accordance with the present invention may also be utilized with other irrigation systems such as part circle systems and traveling systems. Most traveling systems are diesel powered, however, and therefore do not represent a drain on the area electrical power system. The center pivot systems predominate and therefore are illustrated and are exemplary here.

Also located at various positions in the agricultural area 10 are a plurality of stationary soil monitoring sensors 14. These stationary monitors 14 transmit to a central control computer 16 data representative of the actual soil condition parameters at the sensor location such as moisture, nitrogen, phosphorus, and potassium content.

Each of the pivot units 12 also includes environmental sensors 18 and transceiver 20 which gathers and transmits rainfall data, temperature, wind direction and pivot operational data such as water flow rate, electrical power status, etc. to the central control computer 16 and receives commands to from the central control computer 16 to control the start, stop and direction of the pivot pumping equipment and drive motors.

Figure 2:
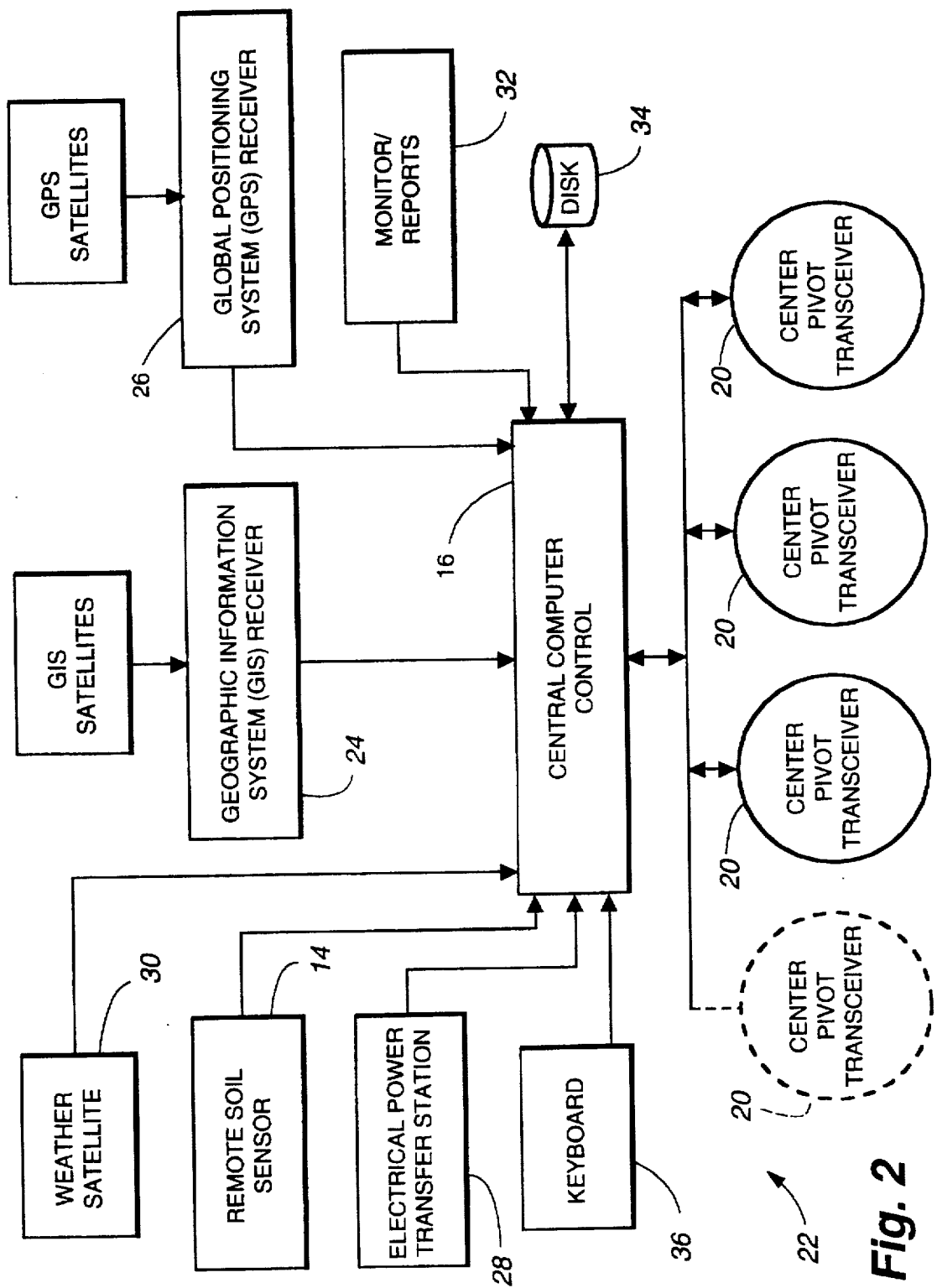
FIG. 2 is a block diagram of the system in accordance with the present invention.

Referring now to FIG. 2, a block diagram of the system 22 in accordance with the invention is shown. The system 22 basically comprises a plurality of irrigation systems 12, a global positioning system receiver 24 to receive and provide position data for each of the irrigation systems 12, a geographic information system (GIS) receiver 26 which receives soil condition data from a geographic information satellite, and a central control programmable computer 16 which receives GIS and GPS data from the receivers 24 and 26 and correlates this data to generate grid maps of each of the irrigation systems 12, generates and transmits operational commands to each of the systems 12.

The system 22 preferably also includes input to the computer 16 from a plurality of remote sensors 14 which provide further soil condition information, input from a power transfer station 28 and input from a weather satellite 30. The remote sensors 14 provide preferably continuous signals to the computer 16 of parameters such as soil moisture, nitrogen, phosphorus, and potassium concentrations at the sensor locations. This information may be used by the computer 16 to supplement and/or confirm the remote signals received from the GIS satellites, or may be used in place of such signals, particularly when frequent cloud cover prevents accurate transmission of such data from the GIS satellites.

The input from the power transfer station 28 is used to monitor the demand on the power grid and transmit signals from the power company as to the most economical time to operate the pivot pumps and drive motors based on electrical system demand. This input may be the most important consideration in sequencing the pivot operations since the pivot pumps and drive motors consume a large amount of power. Therefore, ensuring that they are operated so as to levelize power demands on the power grid represents a savings to the power company and to the commercial customers such as the farm operators in the form of lower rates charged by the power company for such power.

Each of the center pivots 12 preferably carries a transceiver and remote controller 20 for the pivot pumps and motors. This controller starts and stops the pivot pump, monitors operational hours, controls optional additive pumps, and provides status signals to the central computer for monitoring purposes. The pivot 12 also preferably includes sensors 18 which provide environmental parameter signals to the transceiver 20 which are in turn sent to the central computer for processing.

The central computer 16 receives the GPS signals from the receiver 26 and GIS signals from the GIS receiver 24 and generates maps of the agricultural area 10 with the pivot systems 12 and remote sensors 14 accurately positioned or located on the maps. The computer then continually updates the maps based on the GIS input, the remote sensor input data, and the input from pivot sensors 18 to generate the soil condition data. The computer then compares this soil condition data to predetermine irrigation requirements provided by the system operator to determine whether and which irrigation systems should be operated. The computer then assigns a priority to each pivot system based on the difference between actual and desired moisture conditions or other differences as preprogrammed by the operator. Next the computer queries the power transfer station 28 to determine the best time for pivot operation and automatically schedules pivot system operation accordingly.

The central computer 16 also preferably receives input data from a weather satellite 30. The software program in the computer 16 maps the weather data onto the GIS map and therefore modifies the priority established for operation of each pivot 12 based on forecasted weather conditions. For example, if heavy rain is forecasted for the next twenty four hour period in the vicinity of one of the pivots, the computer would automatically delay operation of the irrigation system pivot 12 to permit the remote sensors at the pivot location to confirm that, indeed, heavy rain did fall within the period.

Finally, the computer may generate reports and maps 32 of irrigation usage and soil conditions as well as historical data reports from data continuously stored and updated in the database storage device 34 such as a hard disk drive The computer also issues and automatically transmits appropriate operational signals to each of the pivot system controllers 20.

Each of the pivot controllers 20 may also be locally operated or remotely operated by radio signals which override the signals provided from the computer. These local operations result in changes to the automatic scheduling of operations. The transceivers 20 on the center pivots 12 automatically transmit such local operations data to the computer 16 so that the computer can account for these changes. These changes may be necessary due to corrective or preventive maintenance being performed on the system components. In addition, the computer 16 may be controlled manually to operate the pivot systems as may be from time to time desired.

The method in accordance with the invention of optimizing operation of a remotely controlled irrigation system in an agricultural area basically comprises the steps of:

1) receiving a global positioning system (GPS) signal representative of a position of the irrigation system;

2) receiving a geographic information system (GIS) satellite signal and optionally receiving signals from remote sensors located in the agricultural area of soil conditions in the agricultural area in which the irrigation system is located;

3) correlating the GIS signal and/or remote sensor signals with the GPS signals to generate soil condition information at the position of the irrigation system; and 4) calculating a required period of irrigation system operation based on the soil conditions at the location of the irrigation system. More preferably, the method in accordance with the invention of optimizing operation of a plurality of separately remotely controllable irrigation systems in an agricultural area comprises the steps of:

1) receiving soil condition signals from a plurality of remote sensors located in said agricultural area 2) receiving a global positioning system (GPS) signal representative of a position of each of the irrigation systems and each of said remote sensors;

3) receiving a geographic information system (GIS) satellite signal representative of soil conditions in the agricultural area in which the irrigation systems are located;

4) correlating the GIS signal with the GPS signals to generate soil condition information at the position of each of the irrigation systems;

5) comparing said GIS signal with said remote sensor signals to verify soil conditions at said remote sensor locations; and 6) calculating a required period of irrigation system operation for each system based on the soil conditions at the location of each of the irrigation systems.

More preferably, the optimization system of the invention further comprises the steps of:

7) prioritizing operation of the irrigation system based on the soil condition information; and 8) receiving power demand and generating capacity information from a power generating facility supplying power to the irrigation system; and scheduling operation of each irrigation system according to the priorities established and when the power is cheapest in order to levelize the power demand on the local electrical grid.

The method also preferably may include the steps of receiving a weather satellite signal of predicted weather conditions in the agricultural area, receiving an actual weather condition signal from each of the irrigation system locations and then correlating the weather satellite signal and the actual weather condition signals with the GPS signal to generate predicted weather conditions at each of the irrigation systems. The required operating period and/or its priority is then modified to account for anticipated weather conditions. For example, the computer would prevent irrigation system operation in the event of imminent or actual rain falling at the irrigation system location. Thus the optimization system in accordance with the invention adjusts the required period of operation based on the predicted weather conditions in addition to the other considerations.

The priority assigned to each pivot system may be determined by the sensed soil conditions and the unit electrical power grid costs. For example, the farmer may assign priority categories as to electrical costs as follows: $0.08 per kilowatt hour=Category "A"; $0.06 per kilowatt hour= Category "B"; and $0.04 per kilowatt hour+Category "C". He or she may then simply designate in which category a particular pivot irrigation system is to operate, and let the computer make the final run time assignments based on the soil conditions in combination with the rate category. The farmer may change the category assignments at any time and may override the computer generated priorities in order to meet unanticipated or changing conditions from the transceiver 20 at the pivot location, remotely via phone or radio communication to the computer 16 directly (via coded transmission) or indirectly through an operator at the computer keyboard 36.

While the invention has been described with reference to a particular embodiment thereof, it is to be understood that such description is by way of illustration and not limitation. It is understood that others skilled in the art will recognize that there are alternatives, changes and modifications that may be made to the embodiment described without departing from the scope the invention as defined by the claims.

What is claimed is:

1. A system for optimizing operation of a plurality of independent soil irrigation systems comprising in combination:
   a global positioning system receiver receiving satellite transmission position information for each of said irrigation systems to generate a map;
   a geographical information system (GIS) receiver receiving GIS satellite transmitted soil condition information for said irrigation systems on said map;
   a programmable computer having a data storage device for storing data coupled to said GPS and GIS receivers for mapping said soil condition information onto said map;
   a software program means in said computer for integrating said position information and said soil condition information to produce a priority schedule for operation of each of said irrigation systems in accordance with predetermined irrigation criteria; and
   transmission means coupled to said computer and to each of said irrigation systems for sending a control signal to each of said irrigation systems in accordance with said priority schedule.

2. The system according to claim 1 wherein, said GIS receiver receives nitrogen, phosphorus and moisture content information for each of said irrigation systems.

3. The system according to claim 1 wherein each of said irrigation systems is a circle pivot irrigation system.

4. The system according to claim 3 further comprising said computer having report generating means for producing soil and irrigation usage reports for each of said plurality of pivot systems.

5. A system for optimizing operation of a plurality of independent soil irrigation systems comprising in combination:
   a global positioning system receiver receiving satellite transmission position information for each of said irrigation systems to generate a map;
   a geographical information system (GIS) receiver receiving GIS satellite transmitted soil condition information for said irrigation systems on said map;
   a programmable computer having a data storage device for storing data coupled to said GPS and GIS receivers for mapping said soil condition information onto said map;
   a power grid monitor coupled to said computer for tracking electrical power demand and capacity available to said irrigation systems on said map;
   a software program means in said computer for integrating said position information, and said soil condition information, together to produce a priority schedule for operation of each of said irrigation systems in accordance with predetermined irrigation criteria and available power criteria; and
   transmission means coupled to said computer and to each of said irrigation systems for sending a control signal to each of said irrigation systems in accordance with said priority schedule.

6. The system according to claim 5 wherein said GIS receiver receives nitrogen, phosphorus and moisture content information for each of said irrigation systems.

7. The system according to claim 5 wherein each of said irrigation systems is a circle pivot irrigation system.

8. The system according to claim 7 further comprising said computer having report generating means for producing soil and irrigation usage reports for each of said plurality of pivot systems.

9. A system for optimizing operation of a plurality of independent soil irrigation systems comprising in combination:
   a global positioning system receiver receiving satellite transmission position information for each of said irrigation systems to generate a map;
   a geographical information system (GIS) receiver receiving GIS satellite transmitted soil condition information for said irrigation systems on said map;
   a programmable computer having a data storage device for storing data coupled to said GPS and GIS receivers for mapping said soil condition information onto said map;
   a weather satellite receiver coupled to said computer receiving weather forecasting information for said irrigation systems;
   a power grid monitor coupled to said computer for tracking electrical power demand and capacity available to said irrigation systems on said map;
   a software program means in said computer for integrating said position information, said soil condition information, and said weather forecast information together to produce a priority schedule for operation of each of said irrigation systems in accordance with predetermined irrigation criteria and available power criteria; and
   transmission means coupled to said computer and to each of said irrigation systems for sending a control signal to each of said irrigation systems in accordance with said priority schedule.

10. The system according to claim 9 wherein said GIS receiver receives nitrogen, phosphorus and moisture content information for each of said irrigation systems.

11. The system according to claim 9 wherein each of said irrigation systems is a circle pivot irrigation system.

12. The system according to claim 11 further comprising said computer having report generating means for producing soil and irrigation usage reports for each of said plurality of pivot systems.

13. A method of optimizing operation of a remotely controlled irrigation system in an agricultural area comprising the steps of:
   receiving a global positioning system (GPS) signal representative of a position of said irrigation system;
   receiving a geographic information system (GIS) satellite signal of soil conditions in said agricultural area;
   correlating said GIS signal with said GPS signal to generate soil condition information at said position of said irrigation system; and
   calculating a required period of irrigation system operation based on said and said soil conditions at the location of said irrigation system.

14. The method according to claim 13 further comprising the step of prioritizing operation of said irrigation system based on said soil condition information.

15. The method according to claim 14 further comprising the steps of receiving power demand and generating capacity information from a power generating facility supplying power to said irrigation system and scheduling operation of said irrigation system in accordance with said priority, said generating capacity information and a predetermined power capacity criteria.

16. The method according to claim 13 further comprising receiving a weather satellite signal of predicted weather conditions in said agricultural area;

receiving a weather condition signal from said irrigation system location correlating said weather satellite signal with said GPS signal to generate predicted weather conditions at said irrigation system; and modifying said required period of operation based on said predicted weather conditions at said irrigation system.

17. The method according to claim 16 further comprising the step of prioritizing operation of said irrigation system based on said soil condition information.

18. The method according to claim 14 further comprising the steps of receiving power demand and generating capacity information from a power generating facility supplying power to said irrigation system and scheduling operation of said irrigation system in accordance with said priority, said generating capacity information and a predetermined power capacity criteria.

* * * * *